UNITED STATES PATENT OFFICE.

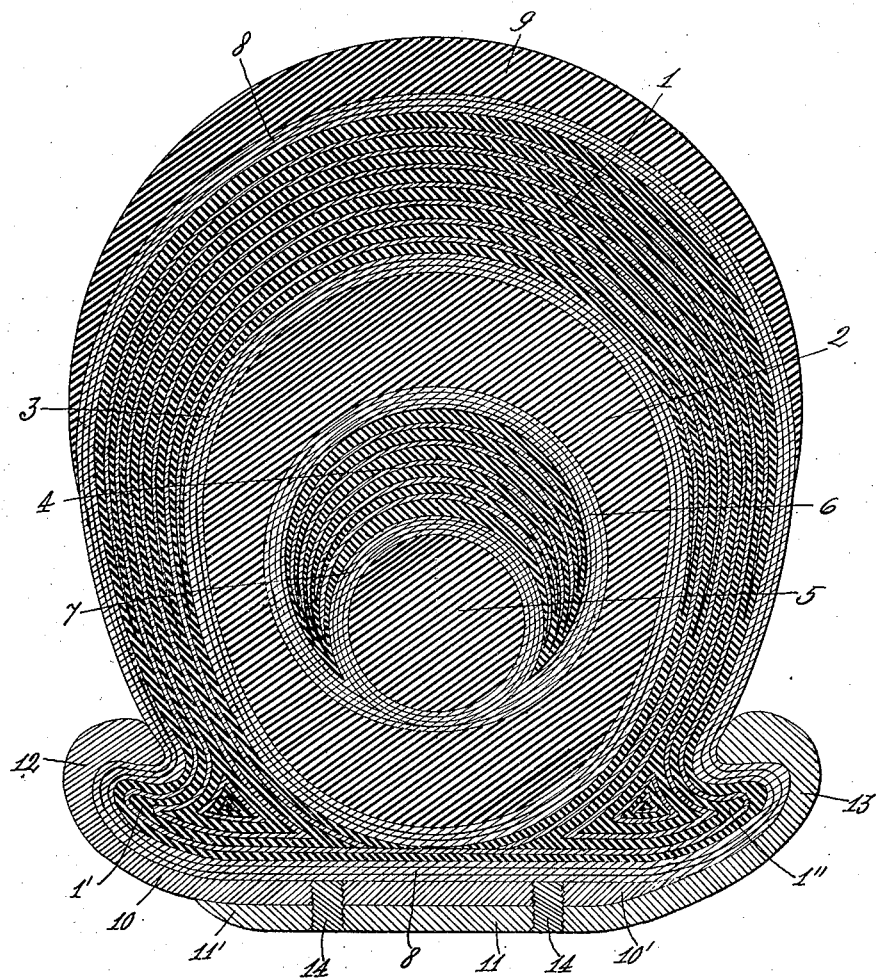

ANDRES BALAGUER, OF MARIANAO, HABANA, CUBA.

RESILIENT TIRE FOR VEHICLE-WHEELS.

1,346,692.   Specification of Letters Patent.   Patented July 13, 1920.

Application filed May 6, 1919. Serial No. 295,231.

*To all whom it may concern:*

Be it known that I, ANDRES BALAGUER, a citizen of the Republic of Cuba, and resident at Marianao, Province of Habana, Republic of Cuba, have invented certain new and useful Improvements in Resilient Tires for Vehicle-Wheels, of which the following is a specification.

This invention relates to resilient tires for vehicle wheels and its object is to provide a tire of that class which has an outer shape similar to the ordinary pneumatic tires but which is entirely solid inside, instead of being hollow and accordingly deprived of air tube, and resulting in a construction which is very appropriate for certain uses such as for traveling on roads of irregular surface, owing to the great durability of a tire of this kind.

In the annexed drawing, the only figure thereon represents in cross-section a resilient tire provided with the improvement forming the subject matter of this invention.

This tire is formed of a body 1 made of overlaying fabrics and caoutchouc layers and which forms the lower side flanges 1' and 1'' but which is entirely closed underneath instead of being interrupted at this part as is the case in the ordinary pneumatic tires, and inside the body 1 is arranged a body of caoutchouc 2 entirely closed on itself forming an oval ring in transverse section and which is separated from the body 1 by a thick and strong fabric 3 which is also closed on itself, and inside the body 2 is arranged a crescent body 4 made of overlaying fabrics and caoutchouc layers which upperly and laterally surrounds a nucleus of caoutchouc 5 of circular section, the body 4 being separated from the body 2 by a reinforcement of thick and strong fabric 6 closed on itself and the nucleus 5 being separated from the body 4 by a similar reinforcement 7 which is also closed on itself and connected to the reinforcement 6. The body 1 is outerly covered with a casing 8 made of a thick and strong fabric and the outer half of this casing is in turn covered with a caoutchouc layer 9.

This tire can be placed on a transportable wheel rim formed by two metallic rings 10 and 11 oppositely having a wedge shaped edge 10' or 11' and the other end an inward concavity channeled flange 12 or 13 for respectively adjusting with the flanges 1' and 1'' of the tire, both rings 10 and 11 being connected by means of countersunk head screws 14 screwed on threaded holes in said rings.

What I claim is:

1. In a tire which in cross section presents a crescent tread, alternate layers of fabric and cushion material beneath said tread, a relatively heavy elliptical cushion beneath said layers, a crescent of fabric and cushion layers within the outer portion of said elliptic member, and a circular cushion within the inner portion of said elliptical member, the said crescent and circular cushion surrounded by circular layers of fabric.

2. In a tire which in cross section presents a crescent tread, beads, alternate layers of cushion material and fabric beneath said tread and forming said beads and completely inclosing an inner elliptical cushion member, a crescent shaped set of layers of fabric and cushion material partially inclosing a circular cushion member and surrounded by a set of fabric layers within said elliptical member.

In testimony whereof I affix my signature hereunto.

ANDRES BALAGUER.